(12) United States Patent
Kim (10) Patent No.: US 12,556,003 B2
(45) Date of Patent: Feb. 17, 2026

(54) ENERGY STORAGE SYSTEM FOR OPTIMUM OPERATION OF DEMAND RESPONSE RESOURCE AND OPERATING METHOD THEREOF

(71) Applicant: LG ENERGY SOLUTION, LTD., Seoul (KR)

(72) Inventor: Daesoo Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 193 days.

(21) Appl. No.: 18/290,074

(22) PCT Filed: Jan. 6, 2023

(86) PCT No.: PCT/KR2023/000316
§ 371 (c)(1),
(2) Date: Nov. 9, 2023

(87) PCT Pub. No.: WO2023/158100
PCT Pub. Date: Aug. 24, 2023

(65) Prior Publication Data
US 2024/0258797 A1    Aug. 1, 2024

(30) Foreign Application Priority Data

Feb. 21, 2022  (KR) .................. 10-2022-0022085

(51) Int. Cl.
*H02J 3/32*        (2006.01)
*G06Q 50/06*    (2024.01)
(Continued)

(52) U.S. Cl.
CPC ................ *H02J 3/32* (2013.01); *G06Q 50/06* (2013.01); *H02J 3/003* (2020.01); *H02J 3/004* (2020.01);
(Continued)

(58) Field of Classification Search
CPC .... H02J 3/32; H02J 3/003; H02J 3/004; H02J 7/0048; H02J 2203/20; H02J 2310/52;
(Continued)

(56) References Cited

U.S. PATENT DOCUMENTS

2013/0162037 A1    6/2013   Kim et al.
2013/0261831 A1    10/2013  Han et al.
(Continued)

FOREIGN PATENT DOCUMENTS

JP    2018-182887 A    11/2018
JP    2019-97267 A     6/2019
(Continued)

OTHER PUBLICATIONS

International Search Report (PCT/ISA/210) issued in PCT/KR2023/000316, dated Apr. 28, 2023.
(Continued)

*Primary Examiner* — Rexford N Barnie
*Assistant Examiner* — Terrence R Willoughby
(74) *Attorney, Agent, or Firm* — Birch, Stewart, Kolasch & Birch, LLP (57) ABSTRACT

An energy storage system is provided as a demand response resource which is associated with a virtual power plant (VPP) system. The energy storage system can include a power generation device for producing electric power, a battery for storing power, an energy management apparatus for monitoring a power generation state and a power consumption state and to establish an operation schedule for the battery, and a power converter for controlling charging/discharging operation of the battery according to the established operation schedule.

18 Claims, 8 Drawing Sheets

(51) Int. Cl.
*H02J 3/00* (2006.01)
*H02J 7/00* (2006.01)

(52) U.S. Cl.
CPC ......... *H02J 7/0048* (2020.01); *H02J 2203/20* (2020.01); *H02J 2310/52* (2020.01); *H02J 2310/54* (2020.01); *H02J 2310/64* (2020.01)

(58) Field of Classification Search
CPC .... H02J 2310/54; H02J 2310/64; H02J 3/008; H02J 3/14; H02J 3/38; H02J 7/35; H02J 2300/24; H02J 3/381; G06Q 50/06; G06Q 10/063; G06Q 30/0201; Y02B 70/3225; Y04S 10/12; Y04S 10/14; Y04S 20/222; Y04S 50/10
See application file for complete search history.

(56) References Cited

U.S. PATENT DOCUMENTS

| | | |
|---|---|---|
| 2016/0209857 A1 | 7/2016 | Nakasone |
| 2016/0377306 A1 | 12/2016 | Drees et al. |
| 2019/0020197 A1 | 1/2019 | Ahn et al. |
| 2019/0147552 A1 | 5/2019 | Nakayama et al. |
| 2019/0173283 A1* | 6/2019 | Epel ..................... G05B 13/048 |
| 2020/0358290 A1 | 11/2020 | Koguma |
| 2022/0109315 A1 | 4/2022 | Jeong et al. |
| 2022/0285939 A1 | 9/2022 | Koo et al. |

FOREIGN PATENT DOCUMENTS

| | | |
|---|---|---|
| JP | 2020-202632 A | 12/2020 |
| JP | 2021-112016 A | 8/2021 |
| KR | 10-2013-0074046 A | 7/2013 |
| KR | 10-2014-0084917 A | 7/2014 |
| KR | 10-2015-0064771 A | 6/2015 |
| KR | 10-2019-0007328 A | 1/2019 |
| KR | 10-2020-0061008 A | 6/2020 |
| KR | 10-2020-0081114 A | 7/2020 |
| KR | 10-2020-0081119 A | 7/2020 |
| KR | 10-2164212 B1 | 10/2020 |
| KR | 10-2021-0086737 A | 7/2021 |
| KR | 10-2021-0116192 A | 9/2021 |
| KR | 10-2021-0141272 A | 11/2021 |
| WO | WO 2013/147545 A1 | 10/2013 |
| WO | WO 2014/208059 A1 | 12/2014 |

OTHER PUBLICATIONS

Japanese Office Action for Japanese Application No. 2023-574257, dated Oct. 15, 2024, with English translation.
Extended European Search Report for European Application No. 23756513.0, dated Oct. 25, 2024.

* cited by examiner

ENERGY STORAGE SYSTEM FOR OPTIMUM OPERATION OF DEMAND RESPONSE RESOURCE AND OPERATING METHOD THEREOF

TECHNICAL FIELD

This application claims priority to and the benefit of Korean Patent Application No. 10-2022-0022085 filed in the Korean Intellectual Property Office on Feb. 21, 2022, the entire contents of which are incorporated herein by reference.

The present invention relates to an energy storage system and a method of operating the energy storage system, and more particularly, to an energy storage system for an optimum operation of demand response resource and an energy operating method thereof, and an management apparatus of the energy storage system.

BACKGROUND ART

Distributed Energy Resources (DER) refers to power resources that provide power in connection with a power distribution network or that can be supported when a power peak occurs. Distributed power sources, energy storage systems (ESSs), and demand resources are examples of distributed resources.

Spread of distributed power sources and small-scale ESS is expanding, but there are limitations in terms of integrated operation as they are scattered in various facilities such as houses and buildings. In order to solve this problem, a virtual power plant (VPP) that integrates and operates various distributed resources as a single power plant using information and communications technology (ICT) has been proposed. The virtual power plant can integrate and operate distributed resources that used to only be managed individually and can improve power generation prediction accuracy through aggregate prediction for each distributed resource, thereby improving stability of a power grid.

Virtual power plants may be classified into a supply type, a demand type, and a convergence type according to a resource collection type. Among them, the demand-type virtual power plant provides a service of stabilizing the power grid by reducing power when a power peak occurs, using collected demand response resources. In general, small facilities such as houses, buildings, and factories participate in virtual power plants as response resources. When a demand response resource reduces power consumption according to a request of a virtual power plant or a VPP provider system, compensation may be provided in a manner such as payment of a settlement amount corresponding to an amount of power reduction.

In general, an energy storage system (ESS) provided in a small-scale facility controls charging and discharging of a battery according to sunlight conditions and load conditions. Such a conventional energy storage system is difficult to properly respond to a demand response request of the virtual power plant, and thus, problems may appear in terms of operation when the energy storage system is linked with a virtual power plant. In addition, conventional energy storage systems operate with a goal of maximizing internal power generation or minimizing external power consumption, but are not optimized in terms of power purchase cost.

Therefore, it is necessary to develop a technology for optimal operations of demand response resources, which can maximize profits according to a demand response through an optimal response to demand response requests as well as minimize power purchase costs for use of grid power.

DETAILED DESCRIPTION OF THE INVENTION

Technical Problem

To obviate one or more problems of the related art, embodiments of the present disclosure provide an energy storage system for an optimum operation of demand response resource.

To obviate one or more problems of the related art, embodiments of the present disclosure also provide a method for operating the energy storage system.

To obviate one or more problems of the related art, embodiments of the present disclosure also provide an energy management apparatus for controlling operations of the energy storage system.

Technical Solution

In order to achieve the objective of the present disclosure, an energy storage system, configured as a demand response resource for a virtual power plant (VPP) system, may include: a power generation device for producing electric power; a battery for storing power; an energy management apparatus configured to collect basic information including information on the power generation state and the power consumption state and information on grid power cost, establish an operation schedule for controlling the charging/discharging operations of the battery using the collected basic information, and upon receiving a demand response (DR) signal during a charge/discharge control process of the battery according to the operation schedule, adjust the operation schedule in response to the demand response (DR) signal; and a power converter configured to control the charging/discharging operations of the battery according to the established operation schedule.

The energy management apparatus may further be configured to derive a charge/discharge amount of the battery per unit time that minimizes a purchase cost of grid power and reflect the charge/discharge amount of the battery per unit time in the operation schedule.

The energy management apparatus may further be configured to derive the operation schedule including a charge/discharge amount of the battery per unit time using an objective function defined as a purchase cost of grid power.

The objective function may be defined with one or more constraint conditions including at least one of a first 1st condition on balance of power supply and power consumption, a second condition on state of charge (SOC) according to charge/discharge efficiency of the battery, a third condition on charge amount limit of the battery, a fourth condition on an output limit of the power converter, and a fifth condition regarding binarization of a charged state and a discharged state.

The energy management apparatus may be further configured to: collect basic information further including battery-related parameters, and information on power production state and power consumption state for a first predefined period; generate power generation prediction information and power consumption prediction information for a predefined second period using the collected basic information, the second period being a period after the first period; and generate the operation schedule for the second period based on the generated power generation prediction information and power consumption prediction information.

The energy management apparatus may further be configured to: upon receiving the DR signal, perform demand response by controlling the charge/discharge operation of the battery to satisfy a DR duration and DR power amount included in the DR signal, regardless of the established operation schedule; and re-establish the operation schedule for a remaining period after execution of demand response.

The energy management apparatus may further be configured to: collect actual measurement information on the power production state and the power consumption state in a process of controlling the battery according to the operation schedule; derive an error regarding a difference between the collected actual measurement information and the information on the power generation state and the power consumption state included in the basic information; and adjust the operation schedule using the derived error.

According to another embodiment of the present disclosure, an energy management apparatus, configured as a demand response resource for a virtual power plant (VPP) system, may include a battery; at least one processor; and a memory configured to store at least one instruction executed by the at least one processor.

The at least one instruction may include: an instruction to collect basic information including information on power generation state and power consumption state and information on grid power cost; an instruction to establish an operation schedule for controlling charging/discharging operations of the battery using the collected basic information; an instruction to control charging/discharging operations of the battery according to the established operation schedule; and an instruction to, upon receiving a demand response (DR) signal during a charge/discharge control process of the battery according to the operation schedule, adjust the operation schedule in response to the DR signal.

The instruction to establish an operation schedule may include an instruction to derive a charge/discharge amount of the battery per unit time that minimizes a purchase cost of grid power and reflects the charge/discharge amount of the battery per unit time in the operation schedule.

The instruction to establish the operation schedule may include an instruction to derive the operation schedule including a charge/discharge amount of the battery per unit time using an objective function defined as a purchase cost of grid power.

The apparatus further includes a power converter and the objective function may be defined with one or more constraint condition including at least one of a first condition on a balance of power supply and power consumption, a second condition on state of charge (SOC) according to charge/discharge efficiency of the battery, a third condition on charge amount limit of the battery, a fourth condition on an output limit of the power converter, and a fifth condition regarding binarization of a charged state and a discharged state.

The instruction to collect basic information may further include collecting battery-related parameters, and information on power production status and power consumption state for a first predefined period. Here, the instruction to establish the operation schedule includes an instruction to generate power generation prediction information and power consumption prediction information for a predefined second period using the collected basic information, the second period being a period after the first period; and an instruction to generate the operation schedule for the second period based on the generated power generation prediction information and power consumption prediction information.

The instruction to adjust the operation schedule may include: an instruction to, upon receiving the DR signal, perform demand response by controlling the charge/discharge operation of the battery to satisfy a DR duration and DR power amount included in the DR signal, regardless of the established operation schedule; and an instruction to re-establish the operation schedule for a remaining period after execution of demand response.

The at least one instruction may further include, after controlling charging/discharging operations of the battery according to the established operation schedule, an instruction to collect actual measurement information on the power production state and the power consumption state in a process of controlling the battery according to the operation schedule; an instruction to derive an error regarding a difference between the collected actual measurement information and the information on the power generation state and the power consumption state included in the basic information; and an instruction to adjust the operation schedule using the derived error.

According to another embodiment of the present disclosure, a method of operating an energy storage system configured as a demand response resource for a virtual power plant (VPP) system may include: collecting basic information including information on power generation state and power consumption state and information on grid power cost; establishing an operation schedule for controlling charging/discharging operations of a battery of the energy storage system using the collected basic information; controlling charging/discharging operations of the battery according to the established operation schedule; and, upon receiving a demand response (DR) signal during a charge/discharge control process of the battery according to the operation schedule, adjusting the operation schedule in response to the DR signal.

The establishing an operation schedule may include deriving a charge/discharge amount of the battery per unit time that minimizes a purchase cost of grid power and reflecting the charge/discharge amount of the battery per unit time in the operation schedule.

The establishing an operation schedule may include deriving the operation schedule including a charge/discharge amount of the battery per unit time using an objective function defined as a purchase cost of grid power.

The objective function may be defined with one or more constraint conditions including at least one of a first condition on a balance of power supply and power consumption, a second condition on state of charge (SOC) according to charge/discharge efficiency of the battery, a third condition on charge amount limit of the battery, a fourth condition on an output limit of the power converter, and a fifth condition regarding binarization of a charged state and a discharged state.

The collecting basic information may include collecting battery-related parameters, and information on power production status and power consumption state for a first predefined period. Here, the establishing an operation schedule include generating power generation prediction information and power consumption prediction information for a predefined second period using the collected basic information, the second period being a period after the first period and generating the operation schedule for the second period based on the generated power generation prediction information and power consumption prediction information.

The adjusting the operation schedule may include, upon receiving the DR signal, performing demand response by controlling the charge/discharge operation of the battery to satisfy a DR duration and DR power amount included in the DR signal, regardless of the established operation schedule; and re-establishing the operation schedule for a remaining period after execution of demand response.

The method may further include: after controlling charging/discharging operations of the battery according to the established operation schedule: collecting actual measurement information on the power production state and the power consumption state in a process of controlling the battery according to the operation schedule; deriving an error regarding a difference between the collected actual measurement information and the information on the power generation state and the power consumption state included in the basic information; and adjusting the operation schedule using the derived error.

Advantageous Effects

According to embodiments of the present disclosure, it is possible to maximize profits according to demand response through optimal response to demand response requests, as well as possible to minimize power purchase costs for use of grid power.

BEST MODE

The present invention may be modified in various forms and have various embodiments, and specific embodiments thereof are shown by way of example in the drawings and will be described in detail below. It should be understood, however, that there is no intent to limit the present invention to the specific embodiments, but on the contrary, the present invention is to cover all modifications, equivalents, and alternatives falling within the spirit and technical scope of the present invention. Like reference numerals refer to like elements throughout the description of the figures.

It will be understood that, although the terms such as first, second, A, B, and the like may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes combinations of a plurality of associated listed items or any of the plurality of associated listed items.

It will be understood that when an element is referred to as being "coupled" or "connected" to another element, it can be directly coupled or connected to the other element or an intervening element may be present. In contrast, when an element is referred to as being "directly coupled" or "directly connected" to another element, there is no intervening element present.

The terms used herein is for the purpose of describing specific embodiments only and are not intended to limit the present invention. As used herein, the singular forms "a", "an" and "the" are intended to include the plural forms as well, unless the context clearly indicates otherwise. It will be further understood that the terms "comprises", "comprising", "includes", "including" and/or "having", when used herein, specify the presence of stated features, integers, steps, operations, constitutional elements, components and/or combinations thereof, but do not preclude the presence or addition of one or more other features, integers, steps, operations, constitutional elements, components, and/or combinations thereof.

Unless otherwise defined, all terms used herein, including technical and scientific terms, have the same meanings as commonly understood by one skilled in the art to which the present invention belongs. It will be further understood that terms, such as those defined in commonly used dictionaries, should be interpreted as having meanings that are consistent with their meanings in the context of the relevant art and will not be interpreted in an idealized or overly formal sense unless expressly so defined herein.

Some terms used herein are defined as follows.

A nominal capacity (Nominal Capa.) refers to a capacity [Ah] of a battery set during development by a battery manufacturer.

State of Charge (SOC) refers to a current state of charge of a battery, represented in percent points [%], and State of Health (SOH) may be a current condition of a battery compared to its ideal or original conditions, represented in percent points [%].

A battery rack refers to a system of a minimum single structure assembled by connecting module units in series/parallel, module units being set by a battery manufacturer. A battery rack can be monitored and controlled by a battery management system (BMS). A battery rack may include several battery modules and a battery protection unit or any other protection device.

A battery bank refers to a group of large-scale battery rack systems configured by connecting several racks in parallel. A bank BMS for a battery bank may monitor and control several rack BMSs, each of which manages a battery rack.

A battery section controller (BSC) refers to a device that controls the topmost level of a battery system including a battery bank level structure or a multiple bank level structure. A battery section controller may also be referred to a battery system controller.

A power limit refers to a limit of power that can be output from a battery, which is set in advance by a battery manufacturer based on a battery condition. A rack power limit may mean an output power limit ([kW]) set for a rack level, and can be set based on a SOC and a temperature of the battery.

The power limit may be a charge power limit or a discharge power limit depending on whether charging or discharging is applied. In addition, according to a battery system structure, a rack power limit or a bank power limit may be defined.

A virtual plant system refers to a set of hardware and software for operations of a virtual power plant (VPP). The virtual power plant may be implemented by being included in one physical device or implemented by being distributed among a plurality of physical devices.

A demand response resource refers to a facility which is in association with a virtual power plant (VPP) system and controls power resources in response to a demand response request from the virtual power plant (VPP) or a VPP provider system. Demand response resources may correspond to various facilities such as houses, buildings, and factories, but the scope of the present invention is not limited to these entities.

Demand Response (DR) refers to changing an amount of grid power consumption by controlling power resources to meet a demand response request.

The demand response request refers to a request for control of power resources for demand response resources or a request for change in power usage for demand response resources. Here, the demand response request may include at least one of a demand response period and demand response power amount (e.g., amount of power reduction).

Hereinafter, exemplary embodiments of the present invention will be described in detail with reference to the accompanying drawings.

Figure 1:
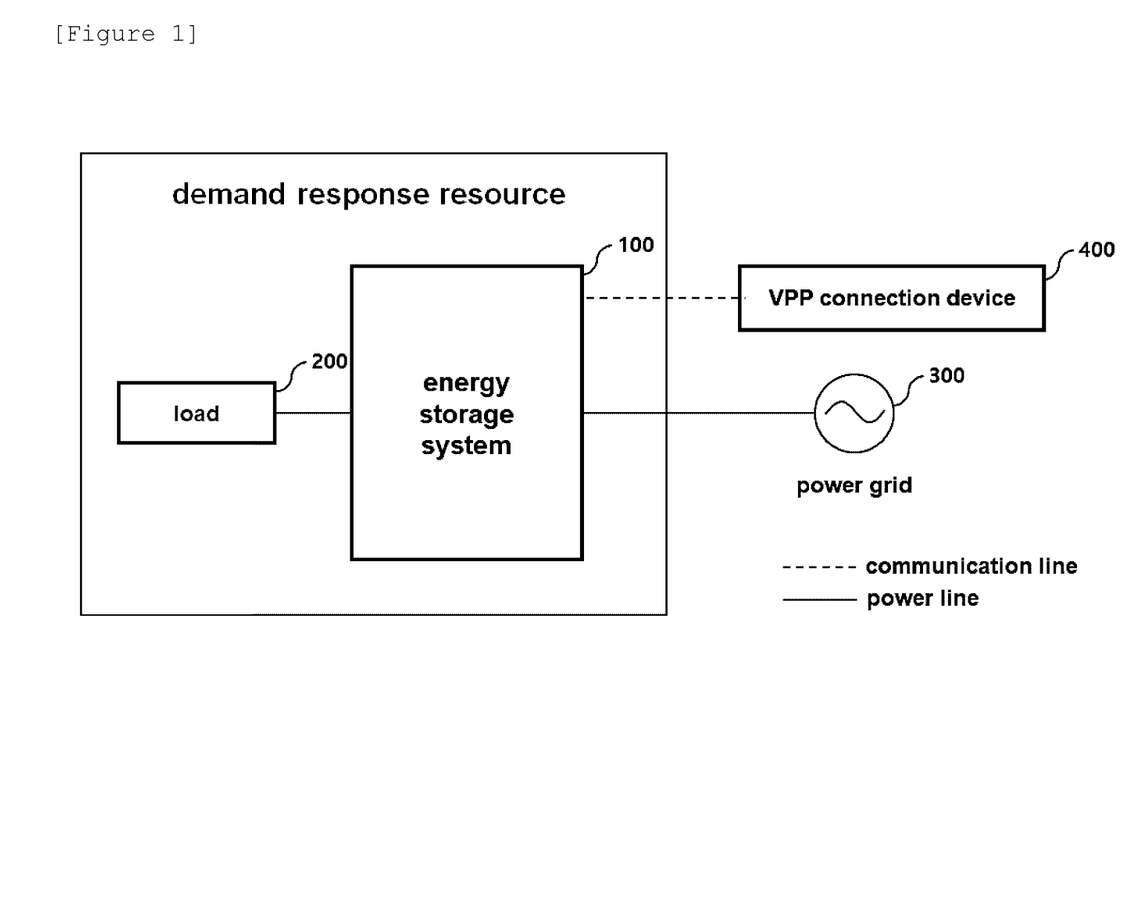
FIG. 1 is a block diagram for explaining an energy storage system according to the present invention.

FIG. 1 is a block diagram for explaining an energy storage system according to the present invention.

As shown in FIG. 1, the energy storage system 100 according to the present invention may be configured inside a demand response resource including a load 200. Here, the energy storage system 100 may receive power from the power grid 300 and supply power, which is received from the grid or internally stored, to the load 200.

The energy storage system 100 is connected to a VPP connection device 400 through a network and is configured to transmit and receive data to and from each other. The energy storage system 100 may receive a demand response (DR) signal, which is a signal related to a demand response request, from the VPP connection device 400.

The VPP connection device 400 may be included in a VPP system or included in an intermediary operator (VPP provider) system. The VPP connection device 400 may be managed by an intermediary operator that collects VPP service participants and demand response resources and provides VPP service. The VPP connection device 400 may generate a demand response (DR) signal when a power peak occurs in the power grid and transmit the demand response signal to the energy storage system 100 configured in the demand response resource.

The energy storage system 100 may monitor states of internal power resources and operate the internal power resources according to a pre-established operation schedule. When a demand response (DR) signal is received from the VPP connection device 400 during operation of power resources, the operation schedule may be adjusted in response to the demand response signal. A detailed description of the establishment and adjustment of the operation schedule will be described later.

Figure 2:
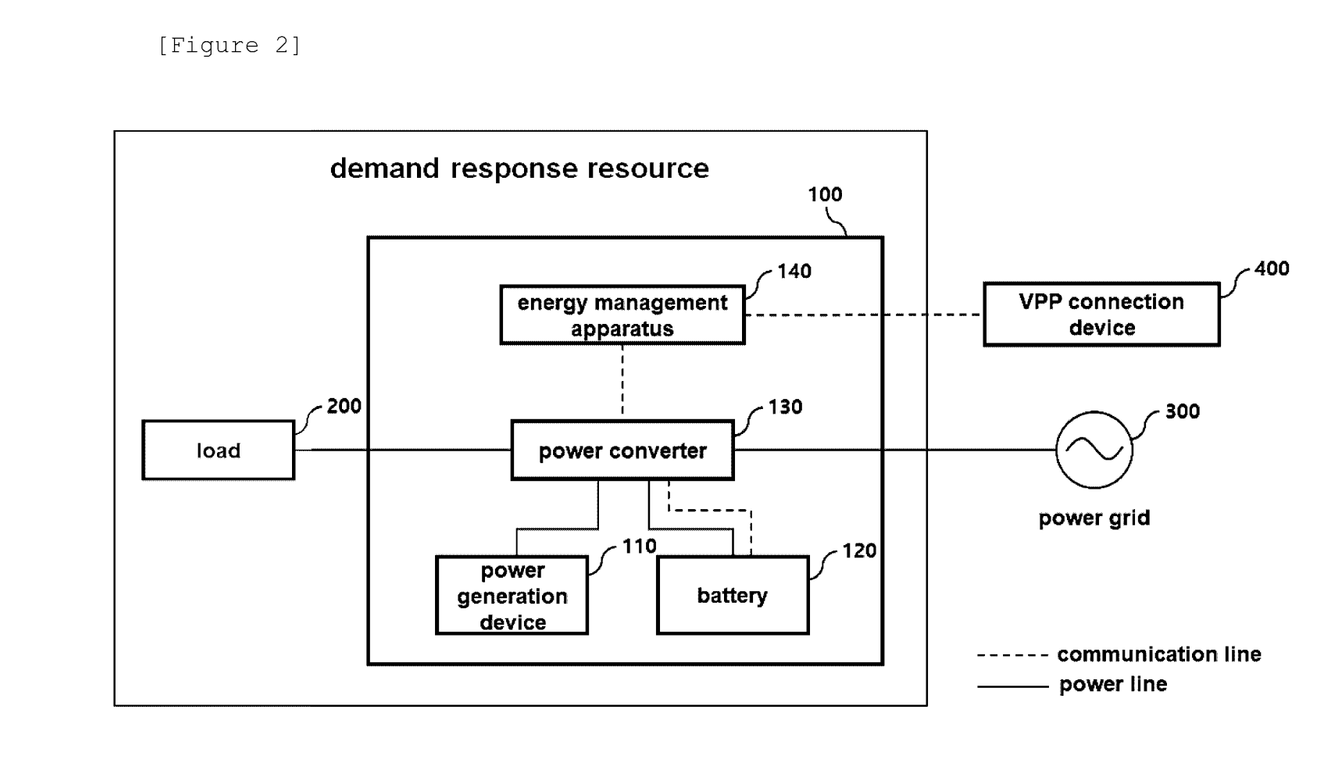
FIG. 2 is a block diagram of an energy storage system according to embodiments of the present invention.

FIG. 2 is a block diagram of an energy storage system according to embodiments of the present invention.

Referring to FIG. 2, an energy storage system 100 according to embodiments of the present invention may include a power generation device 110 for generating power; a battery 120 for storing power; an energy management apparatus 140 that is configured to monitor a power production state and a power consumption state and establish an operation schedule for the battery 120; and a power converter 130 that is configured to control charging and discharging operations of the battery 120 according to the established operation schedule.

The power generation device 110 is a device configured in a demand response resource to generate power, and may include at least one of a power generation device using sunlight, solar heat, wind power, and geothermal heat. Somehow, since the type of power generation device 110 is not an essential component of the present invention, the scope of the present invention is not limited to these entities.

The battery 120, which serves to store power, may be typically implemented in a form of a plurality of battery modules constituting a battery rack and a plurality of battery racks constituting a battery bank. Here, the battery module may be referred to as a battery pack according to a device or system in which batteries are used. A battery management system (BMS) may be installed in each battery. The BMS may monitor current, voltage, and temperature of each battery rack (or pack) it manages, calculate SOC (State Of Charge) based on the monitoring result, and control charging and discharging.

The power converter 130 may control power output from the power generation device 110, charging/discharging power of the battery 120, and power supplied to the load 200. Here, the power converter 130 may control the charging/discharging operation of the battery 120 according to an operation schedule established by the energy management apparatus 140. The power converter 130 may include an AC/DC inverter that converts an DC output of the power generation device 110 and the battery 120 into an AC output and supplies it to the load 200.

The energy management apparatus 140 may collect state information about the power generation device 110, the battery 120, the power converter 130, the load 200, and the power grid 300 to monitor each component. Here, the state information may include at least one of amount of grid power supply, amount of power generation, amount of power consumption, an operating state of the battery 120, and a charging state of the battery 120. The energy management apparatus 140 may be connected to a sensor capable of sensing specific state information or connected to a management device (e.g., BMS) of specific power resource to collect state information on power resources.

The energy management apparatus 140 may establish an operation schedule for controlling charging/discharging operations of the battery 120. Here, the operation schedule may include information about charge/discharge amount of the battery 120 per unit time.

When a specific event occurs in a process of controlling charging and discharging of the battery 120 according to the operation schedule, the energy management apparatus 140 may adjust pre-established operation schedule in response to the event. For example, a specific event may include reception of a demand response (DR) signal or occurrence of an error regarding difference between basic information of an operation schedule and actual measurement information. A detailed description of adjustment of the operation schedule corresponding to a demand response signal and the error will be described later.

Figure 3:
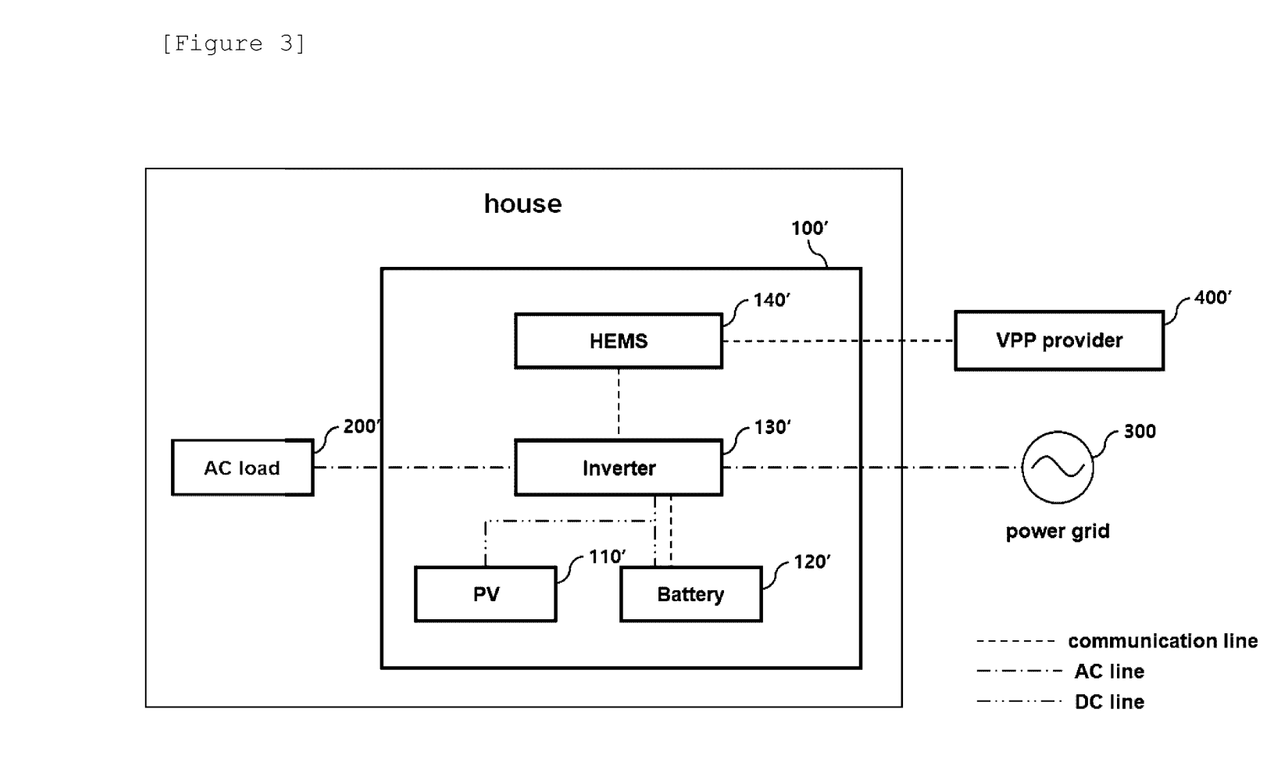
FIG. 3 is a block diagram illustrating an implementation example of an energy storage system according to embodiments of the present invention.

FIG. 3 is a block diagram illustrating an implementation example of an energy storage system according to embodiments of the present invention.

The energy storage system 100' according to embodiments of the present invention may be configured in a house functioning as a demand response resource as shown in FIG. 3. Here, the power generation device may correspond to a photovoltaic (PV) system 110', and the power converter may be implemented by being included in the inverter 130'. The energy management apparatus may be implemented by being included in a Home Energy Management System (HEMS) 140', which is a top-level control system in a house. The VPP connection device may be implemented by being included in the VPP provider system 400' managed by a mediation service provider providing VPP service.

As shown in FIG. 3, the energy storage system 100' may be implemented as a DC coupled energy storage system in which a photovoltaic system 110' and a battery 120' are connected to a DC link. The DC-coupled energy storage system includes a DC/DC converter that can control DC voltage/current individually in each battery rack. Accordingly, the DC/AC converter used for interworking with the photovoltaic system 110' is no longer needed, and thus, efficiency is increased. In addition, even if there is a difference in SOC, SOH, and capacity among respective battery racks, it is possible to control battery power amount in consideration of individual battery characteristics. In addition, PV modules with different power levels can be integrated into one system, and it is advantageous in terms of stability of the photovoltaic system 110'.

Somehow, the energy storage system 100' shown in FIG. 3 is an example for clear description of the present invention and is not intended to limit the scope of the present invention. Unlike disclosure shown in FIG. 3, it may be configured in various demand response resources such as buildings and factories, and some components may be added or substituted, or the connection relationship between components may be changed as needed.

Figure 4:
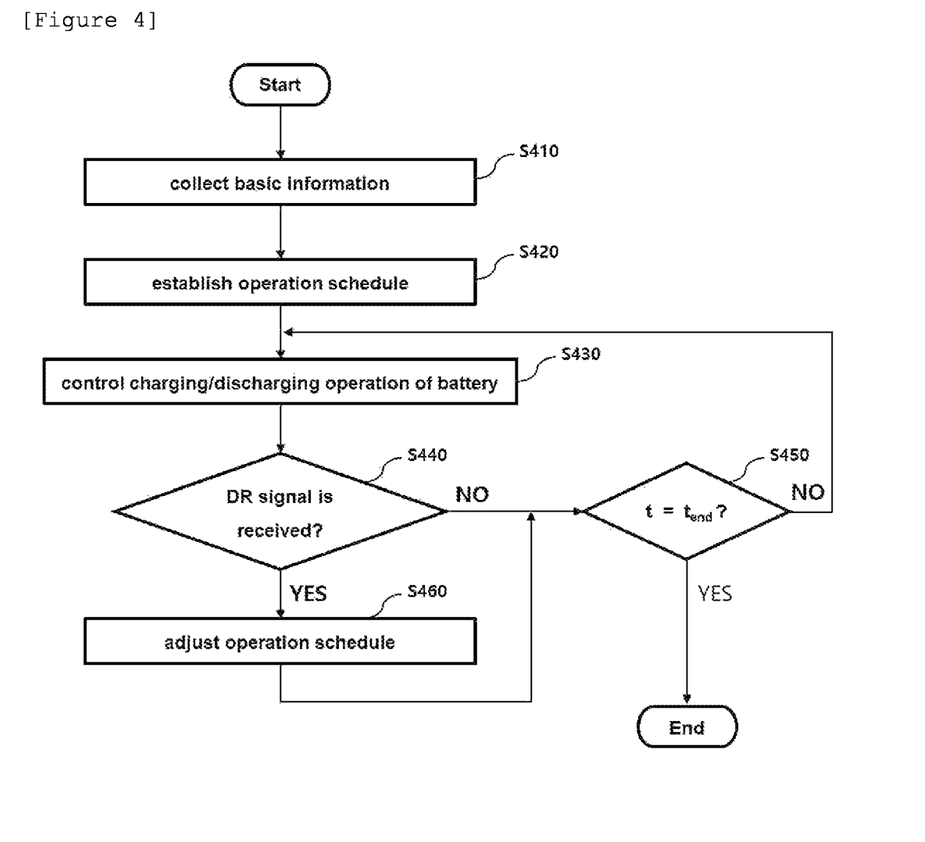
FIG. 4 is an operational flowchart illustrating a method of operating an energy storage system according to embodiments of the present invention.

FIG. 4 is an operational flowchart illustrating a method of operating an energy storage system according to embodiments of the present invention.

A method of operating the energy storage system 100 according to embodiments of the present invention may be performed by the power converter 130 and the energy management apparatus 140 included in the energy storage system 100.

The energy management apparatus 140 may collect basic information for establishing an operation schedule (S410). Here, the basic information may include information about a power production state and a power consumption state and information on grid power cost.

The energy management apparatus 140 may establish an operation schedule for controlling charging/discharging operations of the battery using the e collected basic information (S420). Here, the operation schedule may include a charge/discharge amount of the battery 120 per unit time that minimizes the purchase cost of grid power. In the operation schedule, unit time may be defined in various ways as needed, and may be defined in units of 1 hour, 10 minutes, or 10 seconds, for example. The operation schedule may include information about an operation period, and for example, an operation start time may be defined as 0:00 on a specific day, and an operation end time may be defined as 24:00 on the corresponding day. The energy management apparatus 140 may derive an operation schedule that minimizes purchase costs of grid power based on an optimization technique using an objective function.

The power converter 130 may controls a charging/discharging operation of the battery 120 according to the operation schedule established by the energy management apparatus 140 (S430).

The energy management apparatus 140 may check whether a demand response (DR) signal is received in a process of controlling the charging/discharging of the battery 120 (S440).

If the demand response (DR) signal is not received, the energy management apparatus 140 may check whether the operation end point defined in the operation schedule has elapsed (S450). When the operation end time has not elapsed, the power converter 130 may control the charging/discharging operation of the battery 120 according to the operation schedule (S430). When the operation end point elapses, the power converter 130 may end the control operation according to the corresponding operation schedule.

When a demand response (DR) signal is received, the energy management apparatus 140 may adjust the operation schedule in response to the demand response (DR) signal (S460). Here, the energy management apparatus 140 may generate control information (e.g., a discharge amount and a discharge time of the battery) of the battery 120 to satisfy a DR condition included in the demand response (DR) signal. When performing of the demand response is completed according to the generated control information, the energy management apparatus 140 may adjust the operation schedule for a remaining period after the performing of the demand response. Here, when the operation end time defined in the operation schedule has not elapsed (S450), the power converter 130 may control the charging/discharging operation of the battery 120 according to the adjusted operation schedule (S430).

Figure 5:
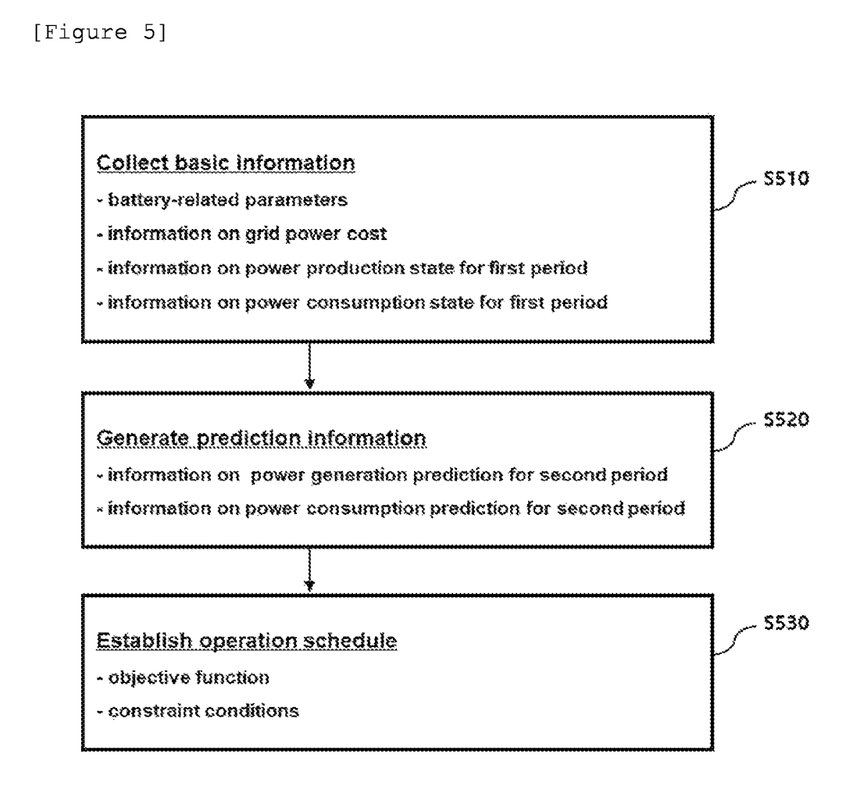
FIG. 5 is an operational flowchart illustrating a method for establishing an operation schedule according to embodiments of the present invention.

FIG. 5 is an operational flowchart illustrating a method for establishing an operation schedule according to embodiments of the present invention. Hereinafter, a detailed embodiment of steps S410 to S420 of FIG. 4 will be described in detail with reference to FIG. 5.

The energy management apparatus 140 may collect basic information (S510). Here, the collected basic information may include battery-related parameters, information on grid power cost, and information on power production state and power consumption state for a first predefined period.

The battery-related parameters may include capacity, an upper limit value of SOC, an lower limit value of SOC, and a lower limit value of SOC setting (a value determined by consultation with a VPP Provider, which may mean SOC that should be left at a minimum when implementing demand response).

The information on grid power cost may include an amount of grid power supply per unit time and a grid power cost per unit time.

The information on the power production state and the power consumption state may include a power generation amount of the power generation device 110 per unit time and a power consumption amount of the load 200 per unit time.

The first period may be defined in various ranges in consideration of prediction accuracy of the prediction information, for example, a period from 1 year before a specific day (day n) to 1 day before the corresponding day (day n−1).

The energy management apparatus 140 may generate prediction information for a predefined second period using the collected basic information, wherein the second period is a period after the first period (S520).

The prediction information may include information on power generation prediction and information on power consumption prediction. Here, the information on power generation prediction may include predicted amount of power generation of the power generation device 110 per unit time and the information on power consumption prediction may include predicted consumption amount of the load 200 per unit time.

The second period is defined as an operating period of the operation schedule, and may be defined, for example, from 0:00 to 24:00 on a specific day (day n).

The energy management apparatus 140 may derive pattern information including a power production pattern and a power consumption pattern based on information on the power production state and power consumption state included in the basic information and may generate information on power generation prediction and information on power consumption prediction using the derived pattern information. For example, by calculating an average value of power generation and power consumption per unit time for a period of one year, an amount of predicted power generation per unit time and an amount of predicted power consumption per unit time for a specific day may be derived.

The energy management apparatus 140 may generate an operation schedule for the second period based on the generated prediction information (S530). Here, the energy management apparatus 140 may derive an operation schedule using an objective function defined based on MILP (Mixed-integer Linear Programming). Hereinafter, specific implementation examples of the method for generating an operation schedule will be described in detail.

The energy management apparatus 140 may derive an operation schedule including a charge/discharge amount of the battery 120 per unit time by using an objective function defined by a purchase cost of grid power. Here, the objective function may be defined as in equation 1 below.

$$\text{Minimize}\left(\sum\nolimits_{t=1}^{t=24} P_{grid_s}(t) * \lambda_{grid}(t)\right) \quad \text{[Equation 1]}$$

(Here, $P_{grid_s}(t)$ refers to a grid power schedule and $\lambda_{grid}(t)$ refers to a grid power cost.)

Equation 1 is an objective function for deriving an amount of charging or an amount of discharging of the battery 120 per unit time capable of minimizing the purchase cost of grid power. Here, the objective function according to equation 1 may be defined with a constraint condition including at least one of 1st condition on balance of power supply and power consumption, 2nd condition on state of charge (SOC) according to charge/discharge efficiency of the battery, 3rd condition on charge amount limit of the battery, 4th condition on an output limit of the power converter, and a 5th condition regarding binarization of a charged state and a discharged state.

$$P_{grid_s}(t) + P_{Bat_{dch}}(t) + P_{Pv_p}(t) = R_{load_p}(t) + P_{Bat_{ch}}(t) \quad \text{[Equation 2]}$$

(Here, $P_{Bat_{ch}}(t)$ is battery charging power, $P_{Bat_{dch}}(t)$ is battery discharging power, $P_{Pv_p}(t)$ is a predicted power generation, and $P_{load_p}(t)$ is a predicted power consumption.)

$$SOC(t+1) = SOC(t) + \frac{\eta_{ch} * P_{Bat_{ch}}(t) - \frac{1}{\eta_{dch}} * P_{Bat_{dch}}(t)}{E_{cap}} * \Delta t \quad \text{[Equation 3]}$$

(Here, SOC(t) is a SOC of the battery, $E_{cap}$ is a capacity of the battery, $\eta_{ch}$ is charge efficiency of the power converter, and $\eta_{dch}$ is discharge efficiency of the power converter.)

$$SOC_{DR\_Min} \leq SOC(t) \leq SOC_{Max} \quad \text{[Equation 4]}$$

(Here, $SOC_{DR\_Min}$ is a set lower limit of SOC and $SOC_{Max}$ is the upper limit of Soc.)

$$P_{Bat_{ch}}(t) - \mu_{ch}(t) * P_{inv\_max} \leq 0 \quad \text{[Equation 5]}$$

(Here, $\mu_{ch}$ is a battery state for charging having a value of 0 or 1, and $P_{Inv\_max}$ is the maximum output of the power converter.)

$$P_{Bat_{dch}}(t) - \mu_{dch}(t) * P_{inv\_max} \leq 0 \quad \text{[Equation 6]}$$

(Here, $\mu_{dch}$ is a battery state for discharging having a value of 0 or 1.)

$$\mu_{ch}(t) + \mu_{dch}(t) \leq 1 \quad \text{[Equation 7]}$$

The first condition may be implemented as Equation 2, and may function such that decision variables $P_{Bat_{ch}}(t)$ and $P_{Bat_{dch}}(t)$ are determined according to balance between power supply and power demand.

The second condition may be implemented as Equation 3, and may function such that a SOC in the next unit time is determined based on the battery capacity and charge/discharge efficiency.

The third condition may be implemented as Equation 4, and may function to determine the SOC within the upper limit and the lower limit range.

The fourth condition and the fifth condition may be implemented by Equations 5 to 7, and may function such that decision variables $P_{Bat_{ch}}(t)$ and $P_{Bat_{dch}}(t)$ do not exceed the output capacity of the power converter 130, and at the same time, the charging power and the discharging power cannot be determined at the same time.

The energy management apparatus 140 may calculate $P_{Bat_{ch}}(t)$ and $P_{Bat_{dch}}(t)$ such that they satisfy the objective function and constraint conditions and an generate operation schedule including them. The objective function and constraint conditions related to establishing the operation schedule may have various modifications, and the scope of the present invention are not limited to the above-described equations.

Figure 6:
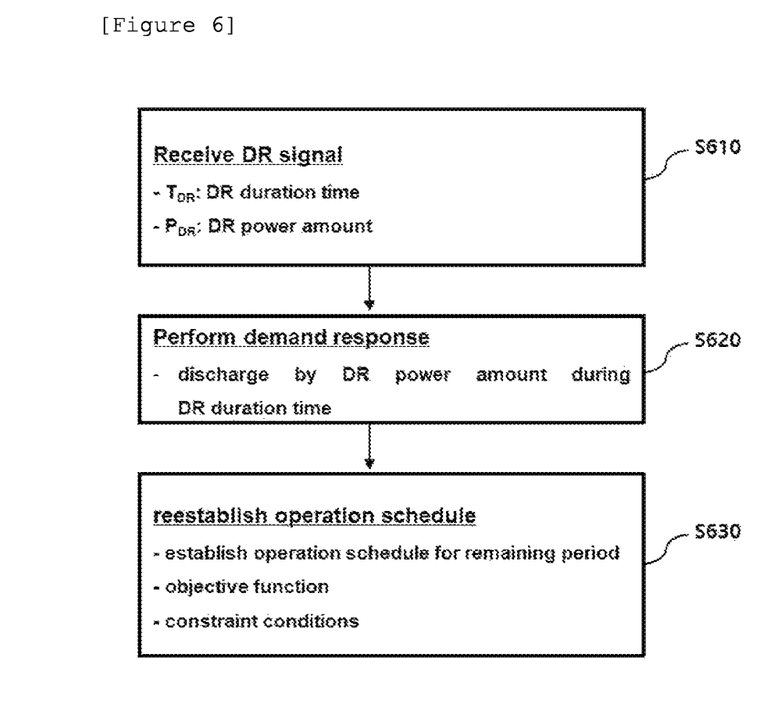
FIG. 6 is an operational flowchart illustrating a method of adjusting an operation schedule for responding to demand response according to embodiments of the present invention.

FIG. 6 is an operational flowchart illustrating a method of adjusting an operation schedule for responding to demand response according to embodiments of the present invention. Hereinafter, a detailed embodiment of step S460 of FIG. 4 will be described in detail with reference to FIG. 6.

The energy management apparatus 140 may receive a demand response (DR) signal from the VPP connection device 400 (S610). The demand response (DR) signal may include a DR condition including at least one of a DR duration time and a DR power amount. Here, the DR duration time may represent operation time for power reduction according to a power peak, and the DR power amount may represent an amount of grid power consumption to be reduced.

The energy management apparatus 140 may control a charging and discharging operation of the battery to satisfy the DR condition included in the demand response (DR) signal, regardless of the pre-established operation schedule to implement the demand response (S620). The energy management apparatus may 140 derive control information of the battery 120 that satisfies the DR condition included in the demand response (DR) signal and the battery 120 may discharge by the DR power amount during the DR duration time according to the derived control information.

After performing the demand response (S620), the energy management apparatus 140 may re-establish an operation schedule for the remaining operating period of the operation schedule (S630). The energy management apparatus 140 may regenerate the operation schedule using the modified objective function according to Equation 8 below. Here, the objective function according to Equation 8 may be set with constraint conditions according to equations 2 to 7 above.

$$\text{Minimize}\left(\sum_{f=t_{DRend}}^{t=24} P_{grid_s}(t) * \lambda_{grid}(t)\right) \quad \text{[Equation 8]}$$

(Here, $t_{DRend}$ is a completion time of demand response)

The energy management apparatus 140 may transmit the re-established operation schedule to the power converter 130 so that the charging/discharging operation of the battery 120 is controlled according to the adjusted operation schedule.

Figure 7:
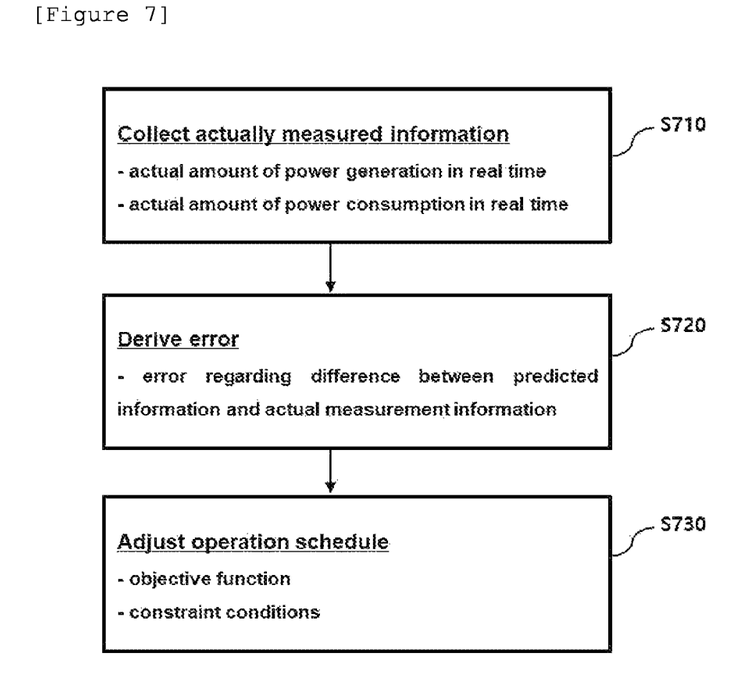
FIG. 7 is an operational flowchart illustrating a method for adjusting an operation schedule for real-time response to an according to embodiments of the present invention.

FIG. 7 is an operational flowchart illustrating a method for adjusting an operation schedule for real-time response to an error according to embodiments of the present invention.

Hereinafter, with reference to FIG. 7, a method for real-time adjustment of an operation schedule that can be performed after step S430 of FIG. 4 regardless of whether or not a DR signal is received (S440) will be described in detail.

The energy management apparatus 140 may collect actually measured information about power production state and power consumption state in a process of controlling the charging and discharging of the battery 120 according to the operation schedule (S710). Here, the collected actual measurement information may include actual amount of power generation and actual amount of power consumption per unit time.

The energy management apparatus 140 may derive an error regarding difference between the information on power production state and power consumption state included in the basic information and the collected actual measurement information (S720). Here, the energy management apparatus 140 may derive the error by calculating the difference between the predicted amount of power generation and power consumption per unit time applied to derive the operation schedule and the actual amount of power generation and power consumption per unit time, as shown in Equation 9 below.

$$P_{error}(t) = \left(P_{load_r}(t) - P_{load_p}(t)\right) - \left(P_{Pv_r}(t) - P_{Pv_p}(t)\right) \quad \text{[Equation 9]}$$

(Here, $P_{error}(t)$ is an error regarding difference between the predicted value and the measured value)

The energy management apparatus 140 may adjust the previously established operation schedule using the derived error (S730). The energy management apparatus 140 may derive an actual grid power value according to Equation 10 below, and reflect the derived actual grid power value to the objective function according to equation 1 and the constraint conditions according to equations 2 to 7 to regenerate the operation schedule.

$$P_{grid_r}(t) = P_{grid_s}(t) + P_{error}(t) \quad \text{[Equation 10]}$$

(Here, $P_{grid_r}(t)$ is an actual amount of grid power.)

The energy management apparatus 140 may regenerate an operation schedule for the remaining operation period after the adjustment point, or may derive a charge/discharge amount of the battery 120 only for a specific unit time in which an error occurs to modify only a part of the operation schedule for the corresponding unit time.

Figure 8:
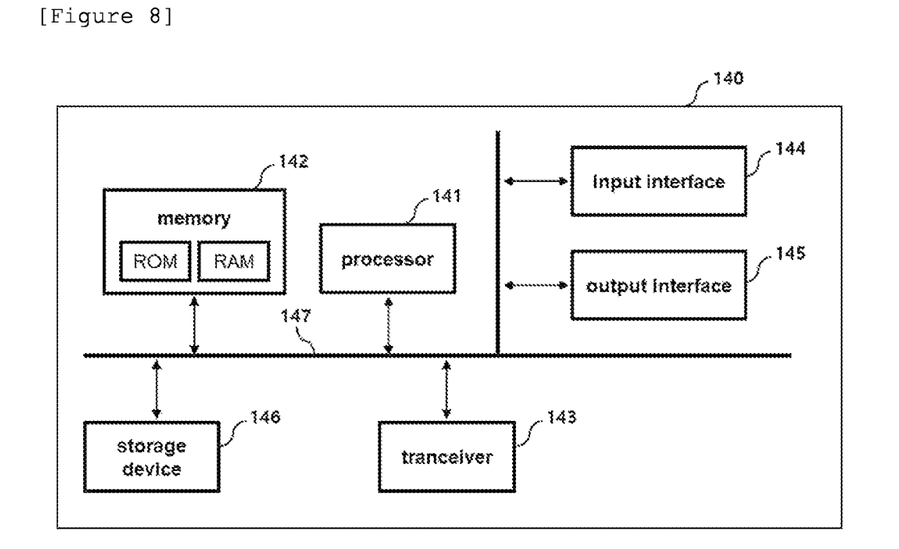
FIG. 8 is a block diagram of an energy management apparatus according to embodiments of the present invention.

FIG. 8 is a block diagram of an energy management apparatus according to embodiments of the present invention. Hereinafter, main components of the energy management apparatus 140 performing the operating method according to embodiments of the present invention will be described with reference to FIG. 8.

An energy management apparatus 140 according to embodiments of the present invention may be a controller of an energy storage system 100 configured in a demand response resource, and may include at least one processor 141, a memory 142 configured to store at least one command executed through the processor, and a transceiver 143 for communicating with other components in the energy storage system 100.

The energy management apparatus 140 according to embodiments of the present invention may be a power management system (PMS) or an energy management system (EMS), but the scope of the present invention is not limited to these entities.

The at least one instruction may include an instruction to collect basic information including information on power generation state and power consumption state and information on grid power cost; an instruction to schedule for controlling establish an operation charging/discharging operations of the battery using the collected basic information; an instruction to control charging/discharging operations of the battery according to the established operation schedule; and an instruction to, upon receiving a demand response (DR) signal during a charge/discharge control process of a battery according to the operation schedule, adjust the operation schedule in response to the demand response (DR) signal.

The instruction to establish an operation schedule may include an instruction to derive a charge/discharge amount of a battery per unit time that minimizes a purchase cost of grid power and reflects the charge/discharge amount of a battery per unit time in the operation schedule.

The instruction to establish an operation schedule may include an instruction to derive an operation schedule including a charge/discharge amount of a battery per unit time using an objective function defined as a purchase cost of grid power.

The objective function may be defined with one or more constraint condition including at least one of 1st condition on a balance of power supply and power consumption, 2nd condition on state of charge (SOC) according to charge/discharge efficiency of the battery, 3rd condition on charge amount limit of the battery, 4th condition on an output limit of the power converter, and a 5th condition regarding binarization of a charged state and a discharged state.

The instruction to collect basic information may include an instruction to collect basic information including battery-related parameters, information on grid power cost, and information on power production status and power consumption state for a first predefined period. Here, the instruction to establish an operation schedule include an instruction to generate power generation prediction information and power consumption prediction information for a predefined second period using the collected basic information, the second period being a period after the first period; and an instruction to generate an operation schedule for the second period based on the generated power generation prediction information and power consumption prediction information.

The instruction to adjust the operation schedule may include: an instruction to, upon receiving the demand response (DR) signal, perform demand response by controlling the charge/discharge operation of the battery to satisfy a DR duration and DR power amount included in the demand response (DR) signal, regardless of the established operation schedule; and an instruction to re-establish the operation schedule for the remaining period after execution of demand response.

The at least one instruction may further include, after controlling charging/discharging operations of the battery according to the established operation schedule, an instruction to collect actual measurement information on the power production state and the power consumption state in a process of controlling the battery according to the operation schedule; an instruction to derive an error regarding difference between the collected actual measurement information and the information on the power generation state and the power consumption state included in the basic information; and an instruction to adjust the operation schedule using the derived error.

The energy storage system 140 may further include an input interface 144, an output interface 145, a storage device 146, and the like. Respective components included in the energy storage system 140 may be connected by a bus 147 to communicate with each other.

Here, the processor 141 may mean a central processing unit (CPU), a graphics processing unit (GPU), or a dedicated processor on which methods according to embodiments of the present invention are performed. The memory (or storage device) may comprise at least one of a volatile storage medium and a non-volatile storage medium. For example, the memory may include at least one of read only memory (ROM) and random access memory (RAM).

The operations of the method according to the embodiments of the present invention may be implemented as a computer-readable program or code on a computer-readable recording medium. The computer-readable recording medium includes all types of recording devices in which data readable by a computer system is stored. In addition, the computer-readable recording medium may be distributed in a network-connected computer system to store and execute computer-readable programs or codes in a distributed manner.

Although some aspects of the invention have been described in the context of the apparatus, it may also represent a description according to a corresponding method, wherein a block or apparatus corresponds to a method step or feature of a method step. Similarly, aspects described in the context of a method may also represent a feature of a corresponding block or item or a corresponding apparatus. Some or all of the method steps may be performed by (or using) a hardware device, such as, for example, a microprocessor, a programmable computer, or an electronic circuit. In some embodiments, one or more of the most important method steps may be performed by such an apparatus.

In the forgoing, the present invention has been described with reference to the exemplary embodiment of the present invention, but those skilled in the art may appreciate that the present invention may be variously corrected and changed within the range without departing from the spirit and the area of the present invention described in the appending claims.

The invention claimed is:

1. An energy storage system configured as a demand response resource for a virtual power plant (VPP) system, the energy storage system comprising:
a power generation device configured to produce electric power;
a battery configured to store power;
an energy management apparatus configured to:
collect basic information including information on a power generation state and a power consumption state and information on grid power cost,
establish an operation schedule for controlling charging/discharging operations of the battery using the collected basic information,
upon receiving a demand response (DR) signal during a charge/discharge control process of the battery according to the operation schedule, adjust the operation schedule in response to the DR signal,
upon receiving the DR signal, perform demand response by controlling the charging/discharging operation of the battery to satisfy a DR duration and DR power amount included in the DR signal, regardless of the established operation schedule, and
re-establish the operation schedule for a remaining period after execution of the demand response; and
a power converter configured to control the charging/discharging operations of the battery according to the established operation schedule.

2. The energy storage system of claim 1, wherein the energy management apparatus is further configured to derive a charge/discharge amount of the battery per unit time that minimizes a purchase cost of grid power and reflect the charge/discharge amount of the battery per unit time in the operation schedule.

3. The energy storage system of claim 1, wherein the energy management apparatus is further configured to derive the operation schedule including a charge/discharge amount of the battery per unit time using an objective function defined as a purchase cost of grid power.

4. The energy storage system of claim 3, wherein the objective function is defined with one or more constraint conditions including at least one of a first condition on balance of power supply and power consumption, a second condition on state of charge (SOC) according to charge/discharge efficiency of the battery, a third condition on charge amount limit of the battery, a fourth condition on an output limit of the power converter, and a fifth condition regarding binarization of a charged state and a discharged state.

5. The energy storage system of claim 1, wherein the energy management apparatus is further configured to:

collect basic information further including battery-related parameters, and information on power generation state and power consumption state for a first predefined period;
generate power generation prediction information and power consumption prediction information for a predefined second period using the collected basic information, the second period being a period after the first period; and
generate the operation schedule for the second period based on the generated power generation prediction information and power consumption prediction information.

6. The energy storage system of claim 1, wherein the energy management apparatus is further configured to:
collect actual measurement information on the power generation state and the power consumption state in a process of controlling the battery according to the operation schedule;
derive an error regarding a difference between the collected actual measurement information and the information on the power generation state and the power consumption state included in the basic information; and
adjust the operation schedule using the derived error.

7. An energy management apparatus configured as a demand response resource for a virtual power plant (VPP) system, the energy management apparatus comprising:
a battery;
at least one processor; and
a memory configured to store at least one instruction executed by the at least one processor,
wherein the at least one instruction includes:
an instruction to collect basic information including information on power generation state and power consumption state and information on grid power cost;
an instruction to establish an operation schedule for controlling charging/discharging operations of the battery using the collected basic information;
an instruction to control the charging/discharging operations of the battery according to the established operation schedule; and
an instruction to, upon receiving a demand response (DR) signal during a charge/discharge control process of the battery according to the operation schedule, adjust the operation schedule in response to the DR signal,
wherein the instruction to adjust the operation schedule includes:
an instruction to, upon receiving the DR signal, perform demand response by controlling the charging/discharging operations of the battery to satisfy a DR duration and DR power amount included in the DR signal, regardless of the established operation schedule; and
an instruction to re-establish the operation schedule for a remaining period after execution of the demand response.

8. The energy management apparatus of claim 7, wherein the instruction to establish the operation schedule includes an instruction to derive a charge/discharge amount of the battery per unit time that minimizes a purchase cost of grid power and reflect the charge/discharge amount of the battery per unit time in the operation schedule.

9. The energy management apparatus of claim 7, wherein the instruction to establish the operation schedule includes an instruction to derive the operation schedule including a charge/discharge amount of the battery per unit time using an objective function defined as a purchase cost of grid power.

10. The energy management apparatus of claim 9, wherein the energy management apparatus further includes a power converter, and
wherein the objective function is defined with one or more constraint conditions including at least one of a first condition on a balance of power supply and power consumption, a second condition on state of charge (SOC) according to charge/discharge efficiency of the battery, a third condition on charge amount limit of the battery, a fourth condition on an output limit of the power converter, and a fifth condition regarding binarization of a charged state and a discharged state.

11. The energy management apparatus of claim 7, wherein the instruction to collect basic information further includes:
collecting battery-related parameters, and information on power generation status and power consumption state for a first predefined period, and
wherein the instruction to establish the operation schedule includes:
an instruction to generate power generation prediction information and power consumption prediction information for a predefined second period using the collected basic information, the second period being a period after the first period; and
an instruction to generate the operation schedule for the second period based on the generated power generation prediction information and power consumption prediction information.

12. The energy management apparatus of claim 7, wherein the at least one instruction further includes: after the controlling charging/discharging operations of the battery according to the established operation schedule:
an instruction to collect actual measurement information on the power generation state and the power consumption state;
an instruction to derive an error regarding a difference between the collected actual measurement information and the information on the power generation state and the power consumption state included in the basic information; and
an instruction to adjust the operation schedule using the derived error.

13. A method of operating an energy storage system configured as a demand response resource for a virtual power plant (VPP) system, the method comprising:
collecting basic information including information on power generation state and power consumption state and information on grid power cost;
establishing an operation schedule for controlling charging/discharging operations of a battery of the energy storage system using the collected basic information;
controlling the charging/discharging operations of the battery according to the established operation schedule; and
upon receiving a demand response (DR) signal during a charge/discharge control process of the battery according to the operation schedule, adjusting the operation schedule in response to the DR signal,
wherein the adjusting the operation schedule includes:
upon receiving the DR signal, performing demand response by controlling charge/discharge operation of the battery to satisfy a DR duration and DR power amount included in the DR signal, regardless of the established operation schedule; and re-establishing the operation schedule for a remaining period after execution of the demand response.

14. The method of claim 13, wherein the establishing the operation schedule includes deriving a charge/discharge amount of the battery per unit time that minimizes a purchase cost of grid power and reflecting the charge/discharge amount of the battery per unit time in the operation schedule.

15. The method of claim 13, wherein the establishing the operation schedule includes deriving the operation schedule including a charge/discharge amount of the battery per unit time using an objective function defined as a purchase cost of grid power.

16. The method of claim 15, wherein the objective function is defined with one or more constraint conditions including at least one of a first condition on a balance of power supply and power consumption, a second condition on state of charge (SOC) according to charge/discharge efficiency of the battery, a third condition on charge amount limit of the battery, a fourth condition on an output limit of the power converter, and a fifth condition regarding binarization of a charged state and a discharged state.

17. The method of claim 13, wherein the collecting the basic information includes:

collecting battery-related parameters, and information on power generation status and power consumption state for a first predefined period, and wherein the establishing the operation schedule includes:

generating power generation prediction information and power consumption prediction information for a predefined second period using the collected basic information, the second period being a period after the first period; and generating the operation schedule for the second period based on the generated power generation prediction information and power consumption prediction information.

18. The method of claim 13, further comprising:

after the controlling the charging/discharging operations of the battery according to the established operation schedule:

collecting actual measurement information on the power generation state and the power consumption state in a process of controlling the battery according to the operation schedule;

deriving an error regarding a difference between the collected actual measurement information and the information on the power generation state and the power consumption state included in the basic information; and adjusting the operation schedule using the derived error.

* * * * *